United States Patent
Nakayama et al.

(10) Patent No.: US 9,209,731 B2
(45) Date of Patent: Dec. 8, 2015

(54) OUTPUT CONTROL DEVICE OF ELECTRIC GENERATOR

(75) Inventors: Shinsaku Nakayama, Wako (JP); Yasuhiro Nakada, Wako (JP); Minoru Maedako, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 249 days.

(21) Appl. No.: 13/590,709

(22) Filed: Aug. 21, 2012

(65) Prior Publication Data

US 2013/0049708 A1 Feb. 28, 2013

(30) Foreign Application Priority Data

Aug. 31, 2011 (JP) ................................. 2011-188171

(51) Int. Cl.
*H02P 9/00* (2006.01)
*H02P 9/10* (2006.01)
*H02P 29/00* (2006.01)

(52) U.S. Cl.
CPC ............ H02P 9/107 (2013.01); H02P 29/0088 (2013.01)

(58) Field of Classification Search
CPC ..... H02P 9/107; H02P 29/0088; H02P 9/006; H02P 29/0044; H02K 11/0047
USPC .............. 322/34, 28, 24, 20, 44, 22
See application file for complete search history.

(56) References Cited

U.S. PATENT DOCUMENTS

| | | | |
|---|---|---|---|
| 3,683,259 A * | 8/1972 | Allport et al. ................. 320/123 |
| 4,470,003 A * | 9/1984 | Mitchell ......................... 322/23 |
| 4,937,514 A * | 6/1990 | Iwatani ........................... 322/33 |
| 4,990,846 A * | 2/1991 | Buck et al. ..................... 323/314 |
| 5,482,013 A * | 1/1996 | Andrews et al. ......... 123/179.21 |
| 5,726,559 A * | 3/1998 | Taniguchi et al. ............... 322/34 |
| 6,018,200 A * | 1/2000 | Anderson et al. ........... 290/40 B |

(Continued)

FOREIGN PATENT DOCUMENTS

| JP | 2003-79194 | 3/2003 |
|---|---|---|
| JP | 2006-304561 | 11/2006 |

OTHER PUBLICATIONS

Japanese Office Action with English translation, dated Aug. 13, 2014, 5 pages.

(Continued)

*Primary Examiner* — Tulsidas C Patel
*Assistant Examiner* — Viet Nguyen
(74) *Attorney, Agent, or Firm* — Rankin, Hill & Clark LLP

(57) ABSTRACT

A rising temperature of components of an electric generator is restrained without deteriorating the quality of electricity output and the user-friendliness of the electric generator. AVR (7) and a temperature detecting means (75) is provided in a generator housing. While the detected temperature is greater than the limitation starting temperature, the output voltage is decreased by decreasing the control target value (for the AVR (7)) in accordance with the temperature. A range between the power generation stopping temperature as an upper-limit temperature of a generator component and the limitation starting temperature set to be a lower than the power generation stopping temperature is defined as a voltage droop range. In the voltage droop range, the control target value is decreased in accordance with a target voltage base value preset in a relationship with the temperature so that the decrease degree becomes greater in proportion to a rising temperature.

10 Claims, 5 Drawing Sheets

(56) References Cited

U.S. PATENT DOCUMENTS

| | | |
|---|---|---|
| 6,740,986 B2 | 5/2004 | Shimizu et al. |
| 7,288,922 B2 | 10/2007 | Maehara et al. |
| 8,217,631 B2 * | 7/2012 | Owens et al. .................... 322/44 |
| 2004/0239295 A1 * | 12/2004 | Sumimoto et al. .............. 322/34 |
| 2006/0238172 A1 | 10/2006 | Maehara et al. |
| 2007/0240662 A1 * | 10/2007 | Kitamura et al. .......... 123/179.4 |
| 2007/0268003 A1 * | 11/2007 | Kolomeitsev et al. .......... 322/33 |
| 2008/0067983 A1 * | 3/2008 | Okamoto ........................ 322/28 |
| 2008/0258692 A1 | 10/2008 | Heinz et al. |
| 2009/0121689 A1 * | 5/2009 | Kikuchi et al. ................. 322/34 |
| 2010/0079118 A1 * | 4/2010 | Matsui ............................ 322/34 |

OTHER PUBLICATIONS

Chinese Office Action dated Jun. 27, 2014, 6 pages.

* cited by examiner

OUTPUT CONTROL DEVICE OF ELECTRIC GENERATOR

TECHNICAL FIELD

The present invention relates to an output control device of an electric generator, and, more particularly, to an output control device of an electric generator that has a function to restrain a rise in the temperature of a component of the electric generator.

BACKGROUND ART

Each component of the electric generator has an upper-limit temperature, and therefore measures are taken to prevent temperature of each component from exceeding the upper-limit temperature during the operation of the electric generator by modification of an arrangement of each component or by forcibly circulating an atmosphere around each component. With respect to modification of the arrangement, A rise in temperature caused by an atmosphere temperature or caused by the self-heating of a component is restrained, for example, by disposing the component at a place at which the component comes into contact with outer air as easily as possible so as to be easily cooled. In a forced air circulation method, a cooling effect is obtained, for example, by disposing an air-circulating fan in a housing of the electric generator and by allowing the fan to supply air to a component that is intended to be restrained from rising in temperature.

Patent Literature 1 discloses a power generation control device for use in vehicles that includes a generator temperature estimating means that estimates the temperature of an attention-focused part of the electric generator based on the temperature of an electric generator, based on the number of rotations of the electric generator, and based on the exciting current of the electric generator and an amount-of-power generation limiting means that limits the amount of power generation when the temperature of the attention-focused part estimated by the generator temperature estimating means exceeds an upper limit value.

CITATION LIST

Patent Literature

Patent Literature 1: Japanese Unexamined Patent Application Publication No. 2006-304561

SUMMARY OF INVENTION

Technical Problem

In the method of cooling components by modifying their arrangement, a limitation is imposed on the arrangement of the components, and, in the forced cooling method, there is a need to provide a fan, and therefore both methods are required to be improved. On the other hand, in the device disclosed by Patent Literature 1, no limitation is imposed on the arrangement of components, and no fan is needed. However, an electric output condition or an environmental condition of the electric generator is affected by how the amount of power generation is concretely limited with respect to a detected temperature, and, as a result, it is presumed that the usable range of the electric generator will be narrowed, and therefore improvements must be carried out.

To overcome the problems mentioned above, it is an object of the present invention to provide an output control device of an electric generator that is capable of enlarging its operable range in consideration of an electric output condition and an environmental condition under which the output control device is used while avoiding noticeable deterioration in the output quality or in the user-friendliness of the electric generator and while restraining a rise in the temperature of components.

Solution to Problem

The first feature of the present invention to accomplish aforementioned object is an output control device of an electric generator, comprising an output control means for controlling an output voltage (Vout) of the electric generator (1); and a temperature detecting means (75) for detecting a temperature in a housing that contains the electric generator; wherein the output voltage is decreased in accordance with the temperature in a range in which the temperature detected by the temperature detecting means (75) is greater than a predetermined limitation starting temperature, the output control device characterized in that a range between a power generation stopping temperature that is an upper-limit temperature of a component included in the electric generator (1) and the limitation starting temperature that is set at a value lower than the power generation stopping temperature is defined as a voltage droop range, and characterized in that, in the voltage droop range, an output voltage (Vout) of the electric generator (1) is decreased in accordance with characteristics that have been preset in a relationship with the temperature so that a decrease degree becomes greater in proportion to a rise in the temperature detected by the temperature detecting means (75). Moreover, the second feature of the present invention is that the output control means is an automatic voltage regulator (7) that converges the output voltage (Vout) of the electric generator (1) with a control target value (Vtgt), and the output voltage (Vout) is decreased by decreasing the control target value (Vtgt) in accordance with the temperature in the range in which the temperature detected by the temperature detecting means (75) is greater than the predetermined limitation starting temperature, and characterized in that, in the voltage droop range, the control target value (Vtgt) is decreased in accordance with a target voltage base value (Vbase) that has been preset in a relationship with the temperature so that a decrease degree becomes greater in proportion to a rise in the temperature detected by the temperature detecting means (75).

The third feature of the present invention is that if the temperature detected by the temperature detecting means (75) is lower than a temperature detected last time, the control target value (Vtgt) is set to be a value higher by a predetermined amount with respect to a target voltage base value (Vbase) preset in a relationship with the temperature.

The fourth feature of the present invention is that if the control target value (Vtgt) has not been updated for a predetermined time, the control target value (Vtgt) is set to be a lower value with respect to the target voltage base value (Vbase) preset in a relationship with the temperature.

The fifth feature of the present invention is that the automatic voltage regulator (7) is arranged into a digital type automatic voltage regulator that includes a substrate (74) on which a CPU (71) and a semiconductor switching means (73) for controlling a field current of the electric generator are mounted, and characterized in that the temperature detecting means (75) is a thermistor element that is mounted on the substrate (74).

Advantageous Effects of Invention

According to the invention that has first and second features, even when a component of the electric generator is used in a harsh temperature environment, the component can be restrained from being deteriorated by overheat so as to reduce its failure risk, and can be restrained from rising in temperature without deteriorating the quality of electricity output by the electric generator or without deteriorating the user-friendliness of the electric generator.

In other words, in the output control device of the electric generator arranged to restrain the heat generation of the electric generator by reducing an output voltage, for example, in such a way as to lower a control target value of an automatic voltage regulator in accordance with the magnitude of temperature in a housing in a range in which the temperature in the housing exceeds a predetermined limitation starting temperature, an output voltage is decreased so that the decrease degree becomes greater in proportion to a rise in temperature in the housing in a predetermined voltage droop range, and therefore the decrease of the output voltage starts slowly as the temperature rises, and the output decrease rate can be raised as the temperature becomes higher. Therefore, even if the temperature becomes higher than the limitation starting temperature, an influence exerted by a voltage variation on a load can be reduced while avoiding a sudden fall in the output voltage, thus making it possible to deal with the output of power generation in a higher temperature or in a power-generation loaded state.

Additionally, the output decrease rate becomes higher in proportion to a rise in the temperature, and therefore even when the temperature quickly becomes high, a situation in which sufficient time is not provided for the output voltage decrease can be avoided, and, in a power-generation stopping temperature that is even higher, the power generation can be stopped, and therefore it is possible to secure endurance reliability with respect to the temperature of the electric generator. Additionally, it is possible to deal with the load while continuing outputting until the temperature of the electric generator rises to the power-generation stopping temperature.

According to the invention that has a third feature, the control target value is raised with a step-by-step constant amount of delay with respect to a target voltage base value when the temperature falls, and therefore the output can be more reliably raised when the temperature falls.

According to the invention that has a fourth feature, based on the fact that the control target value is not updated without detecting a rise in temperature during a fixed time, a fall in temperature is reliably detected, and the output voltage is increased, and therefore the temperature control can be reliably carried out.

According to the invention that has a fifth feature, based on the temperature of a substrate, a temperature rise can be controlled, and therefore a CPU, a semiconductor switch device, and the like that are mounted on the substrate and that are sensitive to a temperature rise can be protected from overheating.

DESCRIPTION OF EMBODIMENTS

Figure 1:
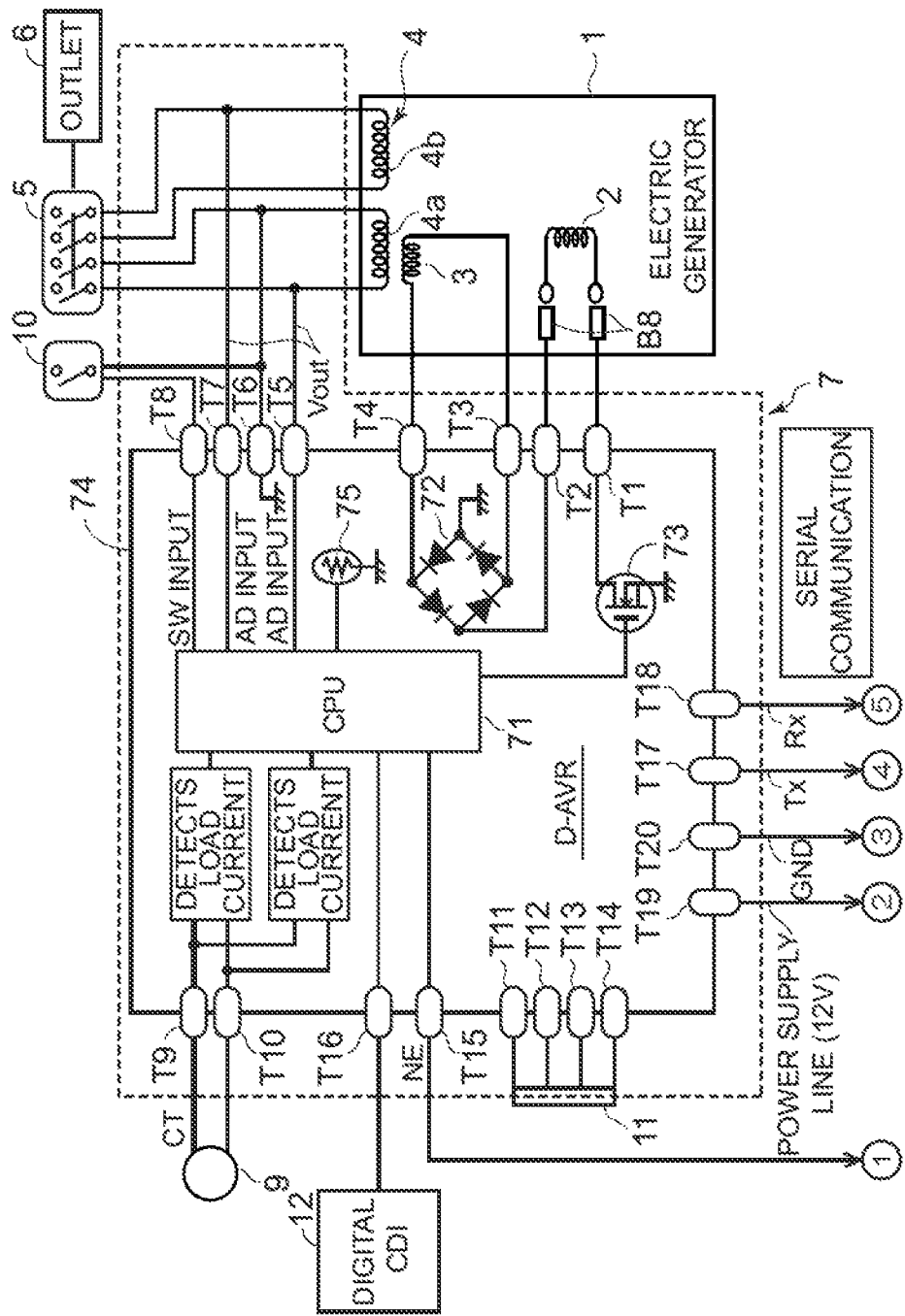
FIG. 1 is a system configuration diagram of a first main part of an electric generator that has an output control device according to an embodiment of the present invention.
Figure 2:
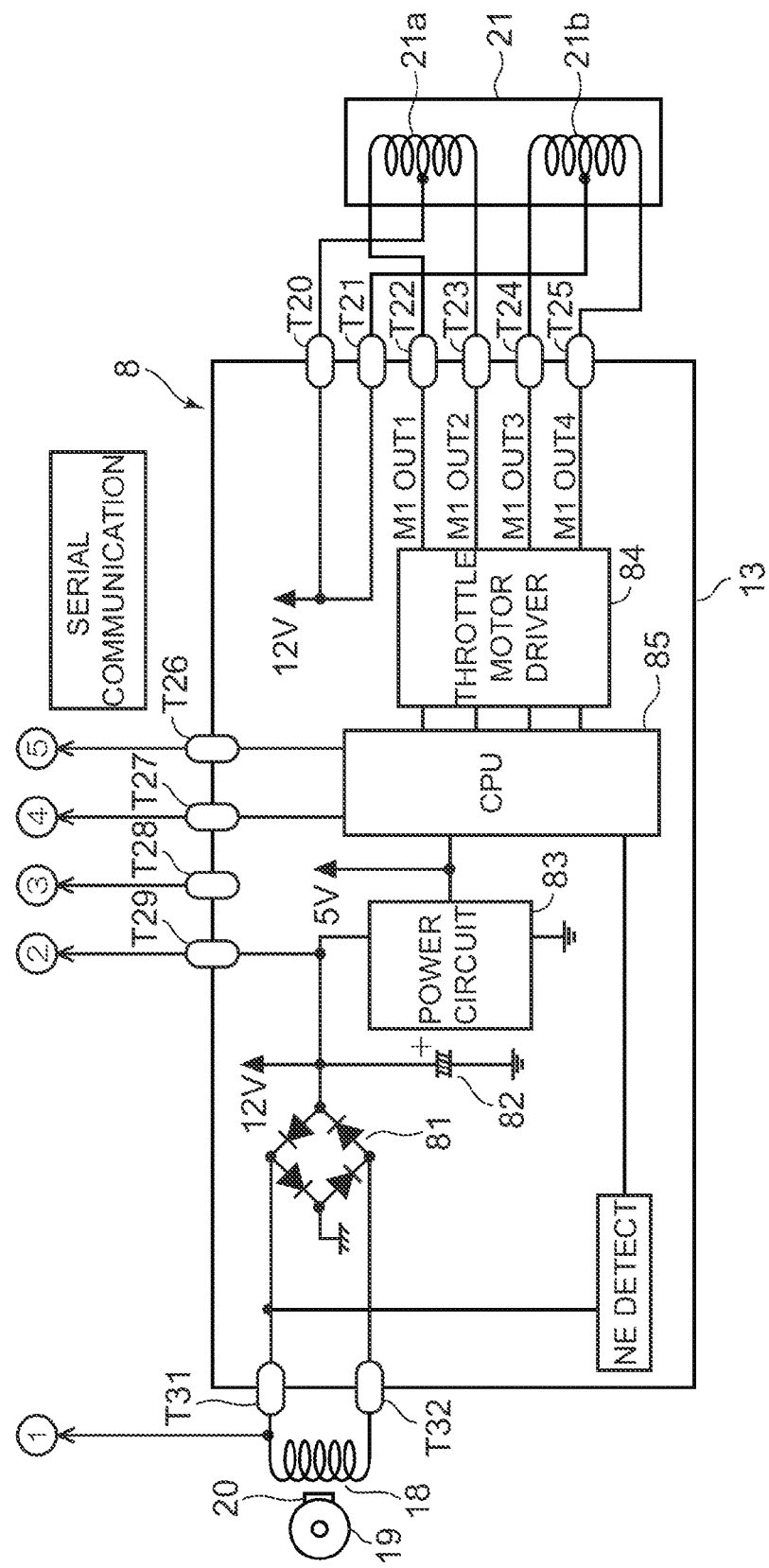
FIG. 2 is a system configuration diagram of a second main part of an electric generator that has an output control device according to an embodiment of the present invention.

An embodiment of the present invention will be hereinafter described with reference to the drawings. FIG. 1 is a system configuration diagram of a first main part of an electric generator that has an output control device according to an embodiment of the present invention. FIG. 2 is a system configuration diagram of a second main part thereof. In the first and second main parts, a connection relationship between the first and second main parts is shown by giving encircled numerals "1" to "5" to the respective parts.

In FIG. 1, an electric generator body 1 is a cylindrical electric generator that includes a field winding 2, an excitation winding 3, and a power generation winding 4. The output control device of the present invention is applicable not only to the cylindrical electric generator but also to a salient pole type electric generator. The field winding 2 is wound onto a rotator provided with a permanent magnet (not shown), and the excitation winding 3 and the power generation winding 4 are wound onto stators (not shown) around the rotator, respectively, and are placed so as to face the rotator. The power generation winding 4 consists of two windings 4a and 4b by which the power generation winding 4 can obtain two-stage output voltages. The rotator on which the field winding 2 is wound is connected to an output shaft (not shown) of an internal combustion engine that is provided as an electric generator driving means.

The power generation windings 4a and 4b are arranged so that either or both of the power generation windings 4a and 4b can be selected by a voltage selector switch 5, and the voltage output from either or both of the power generation windings 4a and 4b selected thereby is connected to an output plug socket 6.

A digital-control-type automatic voltage regulator (D-AVR) 7 is provided as the output control device that regulates the output voltage of the electric generator body 1. The D-AVR (hereinafter, referred to simply as the "AVR") 7 is formed by mounting a CPU 71, a full-wave rectifier 72, and a semiconductor switching element (e.g., a FET) 73 on an AVR substrate 74. The AVR 7 additionally includes a temperature sensor 75 that detects the temperature of the AVR substrate 74 representing the temperature in the housing that contains the electric generator body 1. Although a thermistor element is used as the temperature sensor 75 herein, a well-known temperature detecting means can be used without being limited to the thermistor element. The reason why the temperature in the housing is represented by the temperature of the thermistor element 75 mounted on the AVR substrate 74 is that, especially, it is suitable to protect the FET 73 that is susceptible to the influence of a temperature rise.

Both ends of the field winding 2 are connected to terminals T1 and T2, respectively, of the AVR substrate 74 via a brush B8. The terminal T1 is connected to a drain of the FET 73, whereas the terminal T2 is connected to a DC side (direct-current side) of the full-wave rectifier 72. A source of the FET 73 is grounded. A gate of the FET 73 is connected to the CPU 71 in order to perform the on/off control of the FET 73 based on a driving signal (i.e., current-carrying rate signal) transmitted from the CPU 71.

Both ends of the excitation winding 3 are connected to an AC input side of the full-wave rectifier 72 via terminals T3 and T4, respectively. Electric potentials of both ends of the power generation windings 4a and 4b are subjected to an A/D conversion by an A/D converter (not shown), and are connected to terminals T5, T6, and T7 of the CPU 71 as electric-generator output voltages Vout, respectively. An eco-switch 10 is provided as a command means for achieving an operation with a low fuel consumption by regarding the number of engine rotations as the number of idle rotations when a load is not connected thereto or when a load is lower than a predetermined value. The eco-switch 10 is connected to the CPU 71 through the terminals T6 and T8, and the CPU 71 can select the number of idle rotations as the target value of the number of engine rotations while recognizing the operational state (i.e., on/off state) of the eco-switch 10. The terminal T6 is provided for an earth terminal.

A shunt 9 is provided as a load current detecting means of the electric generator body 1. A load current detected by the shunt 9 is inputted to the CPU 71 through terminals T9 and T10. Terminals T11, T12, T13, and T14 connected to a connector 11 used for a diagnostic device can be additionally mounted on the AVR substrate 74. A signal NE indicating the rotational position of the engine is inputted to the CPU 71 via a terminal T15. A digital CDI (Capacitor Discharge Ignition) 12 is connected to a terminal T16.

Terminals T17 and T18 are used to connect a transmission line TX for serial communication and a reception line RX for serial communication that are laid between an electronic governor shown in FIG. 2 and each terminal, and terminals T19 and T20 are used to connect a power supply line V12 and a ground line GND that are connected to the electronic governor shown in FIG. 2 and that receive the supply of a power-supply voltage (12 volts) from the electronic governor.

The housing of the electric generator is arranged so that it can contain the electric generator body 1, the AVR 7, and the electronic governor 8 that is described with reference to FIG. 2.

The second main part shown in FIG. 2 includes the electronic governor 8 that converges the number of rotations of the engine with a predetermined value. The electronic governor 8 includes a full-wave rectifier 81, a capacitor 82, a power circuit 83, a throttle motor driver 84, and a CPU 85 that are mounted on a governor substrate 13. The AC side of the full-wave rectifier 81 is connected to both ends of a control power source winding 18 via terminals T31 and T32. The control power source winding 18 is disposed so as to face a permanent magnet 20 provided in an output shaft of the engine or in a rotational body (e.g., flywheel) 19 that rotates in synchronization with the output shaft, and an electric current is induced in the control power source winding 18 in response to the rotation of the flywheel 19. The electric current induced in the control power source winding 18 is an alternating current that changes in accordance with the rotational position of the engine, i.e., in accordance with the phase angle, and the electric current induced therein corresponds to the number of engine rotations NE. In the AVR 7 of the first main part, a number-of-rotations signal is inputted to the CPU 71 via the terminal T15, and, based on this number-of-rotations signal, the CPU 71 can be arranged so that the output of the electric power starts from the electric generator to a load when the number of engine rotations reaches the number of output-start rotations of the electric generator.

In the electronic governor 8, the full-wave rectifier 81 has its AC side connected to the control power source winding 18, and has its DC side connected to the capacitor 82 and to the power circuit 83 connected in parallel with the capacitor 82. The output voltage of the full-wave rectifier 81 is, for example, DC 12 volts, and, in the power circuit 83, is converted from DC 12 volts mentioned here to DC 5 volts used for the operating power source of the CPU 85.

The electronic governor 8 controls the number of engine rotations while changing the opening degree of a throttle valve (not shown) of an engine (not shown), and a stepping motor 21 used to change the opening degree is connected to the electronic governor 8. In detail, stator coils 21a and 21b of the stepping motor 21 are connected to terminals T20, T21, T22, T23, T24, and T25. The terminals T20 and T21 are connected to center taps of the coils 21a and 21b used for driving, respectively, and both ends of the stator coil 21a and both ends of the stator coil 21b are connected to the terminals T22 and T23 and to the terminals T24 and T25, respectively. The output side of the full-wave rectifier 12 is connected to the terminals T20 and T21 to which the center taps are connected, and a voltage of DC 12 volts is applied to the stator coils 21a and 21b.

The transmission line TX and the reception line RX are connected to terminals T27 and T26, respectively, in the electronic governor 8, and the terminals T27 and T26 are connected to the CPU 85. The CPU 71 and the CPU 85 are arranged so that each other's states can be monitored by serial communication through the transmission line TX and the reception line RX. The output side of the full-wave rectifier 81 is connected in order to supply the operating power source of the AVR 7.

In the above-mentioned arrangement, when the rotator on which the field winding 2 is wound is rotated by the engine, an electromotive force is generated by the change of magnetic flux of the permanent magnet in the excitation winding 3 interlinked with the permanent magnet of the rotator, and an electric current flows therethrough. The resulting electric current is inputted to the full-wave rectifier 72, and a voltage rectified by the full-wave rectifier 72 is applied to the field winding 2. The field winding 2 is connected to the FET 73, and therefore when a current-carrying rate signal transmitted from the CPU 71 is inputted to the gate of the FET 73, an electric current flows through the field winding 2 during an ON time of the FET 73 that corresponds to the current-carrying rate. Therefore, the electric current flowing through the power generation winding 4 is changed by the electric current flowing through the field winding 2 in accordance with the current-carrying rate, and the output voltage of the electric generator body 1 is changed.

The CPU 71 sets a control target value Vtgt in accordance with a predetermined target voltage base value Vbase, and the current-carrying rate signal input to the FET 73 is controlled so that the electric-generator output voltage Vout converges with this control target value Vtgt. Herein, the target voltage base value can be determined by program processing in the CPU 71 in accordance with the temperature of the AVR substrate 74 detected by the thermistor element 75.

The CPU 85 has a target value of the number of engine rotations, and the electronic governor 8 drives the throttle motor driver 84 and controls the throttle opening degree so that the number of engine rotations NE detected based on an alternating current generated in the control power source winding 18 converges with the target value.

Figure 3:
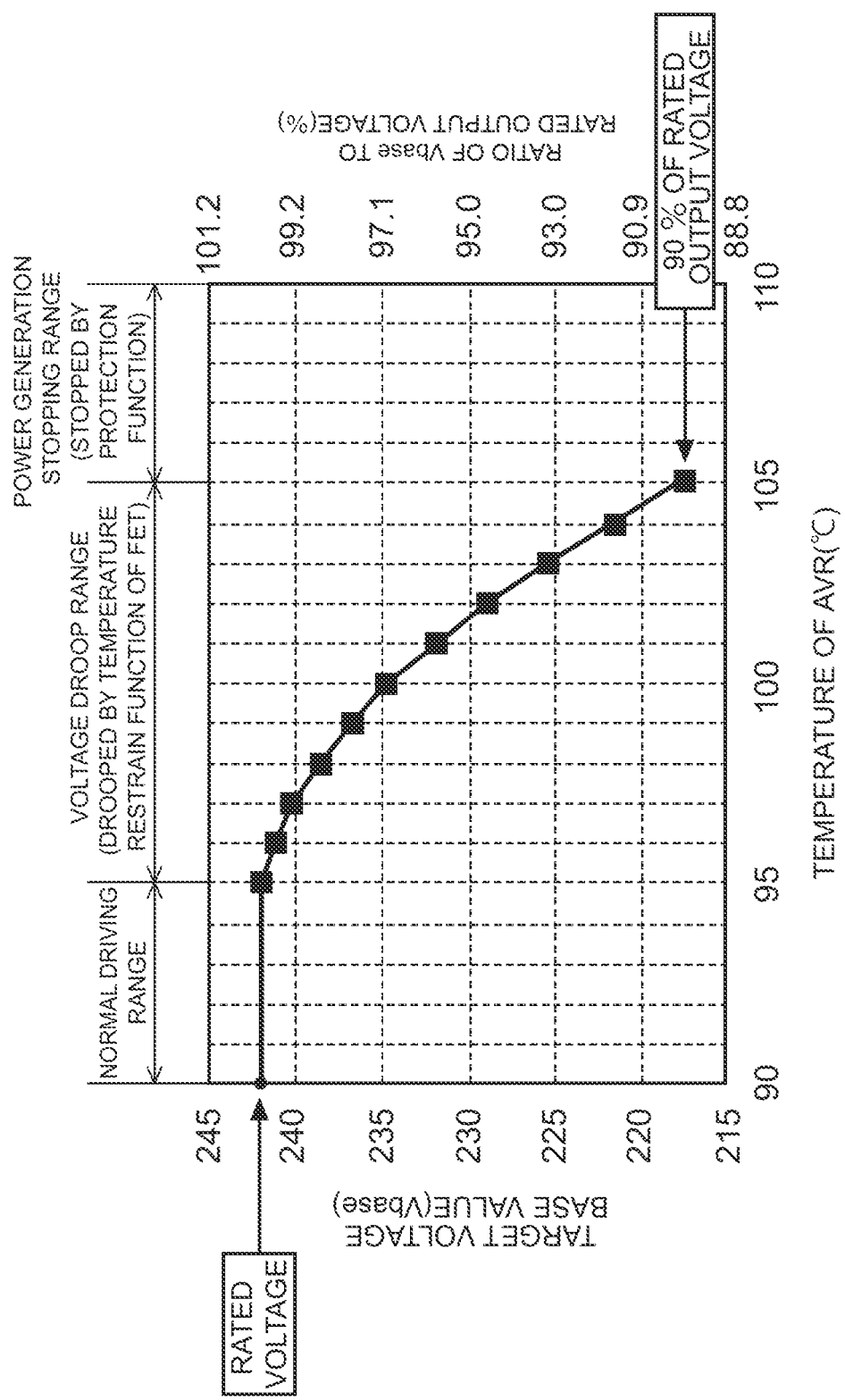
FIG. 3 is a view showing a relationship between the temperature of the AVR substrate detected by the thermistor element and the target voltage base value "Vbase".

FIG. 3 is a view showing a relationship between the temperature of the AVR substrate 74 detected by the thermistor element and the target voltage base value Vbase. In FIG. 3, the axis of abscissas shows the temperature (° C.), and the axis of ordinates shows the target voltage base value Vbase (bolt). The right-hand ordinate axis shows the ratio (%) of the target voltage base value Vbase to the rated output voltage.

In the example of FIG. 3, the CPU 71 outputs a current-carrying rate signal to the FET 73 so that the electric power of the rated voltage (242 volts) can be output as that of a normal driving range until the temperature rises to 95° C. that is set as an output droop starting temperature in the temperature of the AVR substrate 74. On the other hand, a range from 95° C. to 105° C. in the temperature of the AVR substrate 74 detected by the thermistor element 75 is defined as a voltage droop range. Additionally, a range exceeding 105° C. that is the upper-limit temperature of a component disposed on the AVR substrate 74 in the temperature of the AVR substrate 74 detected by the thermistor element 75 is defined as a power generation stopping range.

In the normal driving range, the target voltage base value Vbase is kept constant even when the temperature is rising or is falling. In other words, the target voltage base value Vbase and the control target value Vtgt are the same as each other.

In the voltage droop range, the target voltage base value Vbase is changed according to a quadratic function with respect to the temperature of the AVR substrate 74. It is recommended to set a minimum target voltage base value Vbase in the voltage droop range at 90% of the rated output. The reason is that a load-following capability is secured, and user-friendliness is prevented from deteriorating. In the voltage droop range, when the temperature of the AVR substrate 74 is rising, the target voltage base value Vbase is decreased corresponding to the temperature along a quadratic curve, and, following this, the control target value Vtgt is decreased. On the other hand, when the temperature of the AVR substrate 74 is falling, the control target value Vtgt is increased with a predetermined duration of delay with respect to the target voltage base value Vbase although the target voltage base value Vbase is increased corresponding to the temperature along the quadratic curve.

In other words, in order to obtain a rapid temperature-restraining effect when the temperature of the AVR substrate 74 is rising in the voltage droop range, it is recommended to decrease the control target value Vtgt while following the target voltage base value Vbase. On the other hand, when the temperature of the AVR substrate 74 is falling in the voltage droop range, the fact that the temperature is undoubtedly falling is confirmed, and then the control target value Vtgt is increased. Therefore, if a temperature falling state continues, for example, for 30 seconds, the control target value Vtgt is updated by the target voltage base value Vbase corresponding to a temperature lower by a predetermined temperature (for example, 1° C.) from the target voltage base value Vbase according to the temperature that has fallen. The reason why the control target value is updated when a temperature falling state continues as mentioned above is that the target voltage base value Vbase should be changed after confirming that the temperature is undoubtedly falling. The reason why the control target value Vtgt is set to be lower than the target voltage base value Vbase is that protection against the temperature is reliably achieved by performing the rising of the voltage even more carefully. Additionally, the reason is that a change in the target voltage base value Vbase is greater than a change in the temperature in a high-temperature side range of the voltage droop range, and therefore it is preferable to avoid a rapid output change so as not to deteriorate user-friendliness when the temperature is falling.

Figure 4:
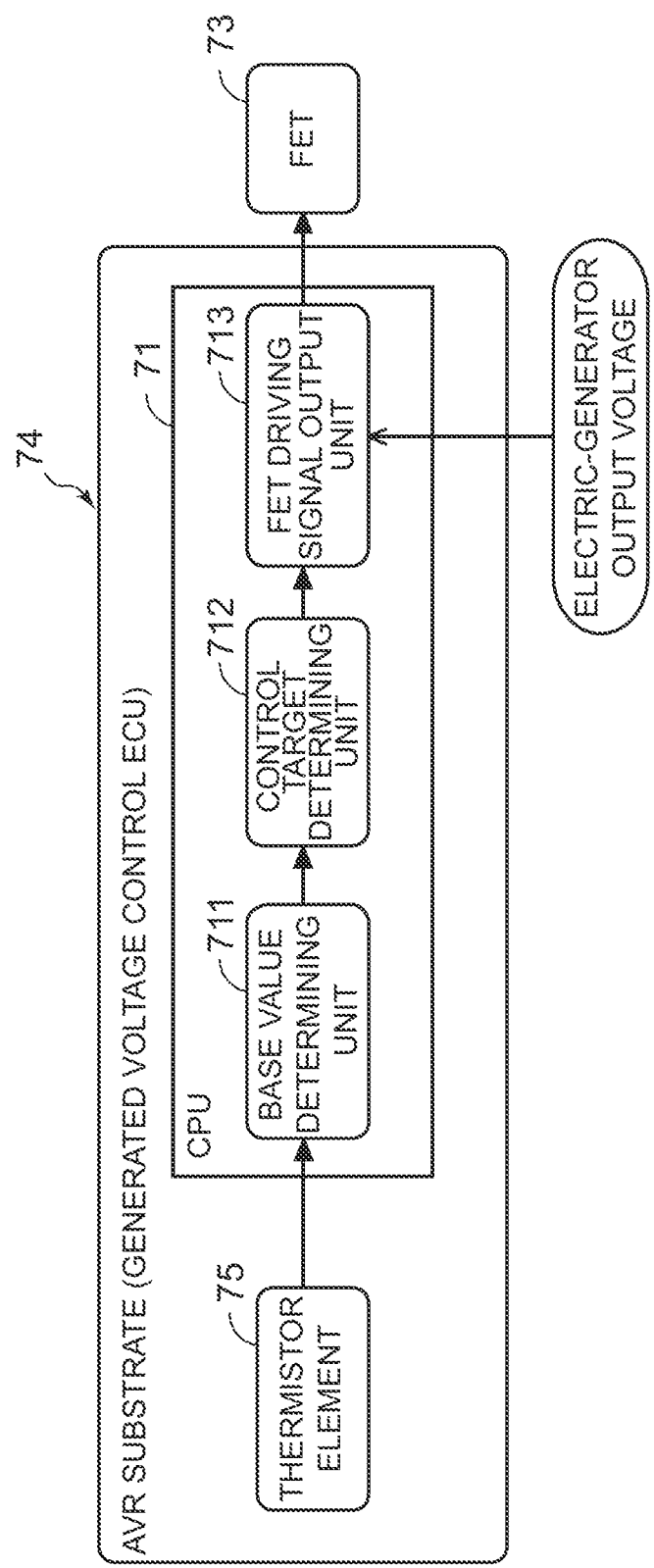
FIG. 4 is a block diagram showing a main function of the AVR that controls output voltage generated by the generator.

FIG. 4 shows the function of a main part of the AVR 7 that controls the output voltage generated by the electric generator body 1. In FIG. 4, the thermistor element 75 senses the temperature of the AVR substrate 74, and the temperature sensed thereby is inputted to the CPU 71. The CPU 71 includes a base value determining unit 711 that determines a target voltage base value Vbase in accordance with the temperature of the AVR substrate 74. The target voltage base value Vbase determined thereby is inputted to a control target determining unit 712. The control target determining unit 712 determines a control target value Vtgt in accordance with the relation of the quadratic curve described with respect to FIG. 3. The algorithm for determining the control target value Vtgt has been described above. A FET driving signal output unit 713 determines a current-carrying rate according to a deviation ΔV of the electric-generator output voltage Vout with respect to the control target value Vtgt so as to cancel the deviation ΔV by allowing a control target value Vtgt determined by the control target determining unit 712 and an electric-generator output voltage Vout generated by the power generation winding 4 to be input, and the FET driving signal output unit 713 inputs a current-carrying rate signal serving as a driving signal to the FET 73. It is recommended to set the current-carrying rate to become a greater value in proportion to an increase in the deviation ΔV and to become a smaller value in proportion to a decrease in the deviation ΔV.

Figure 5:
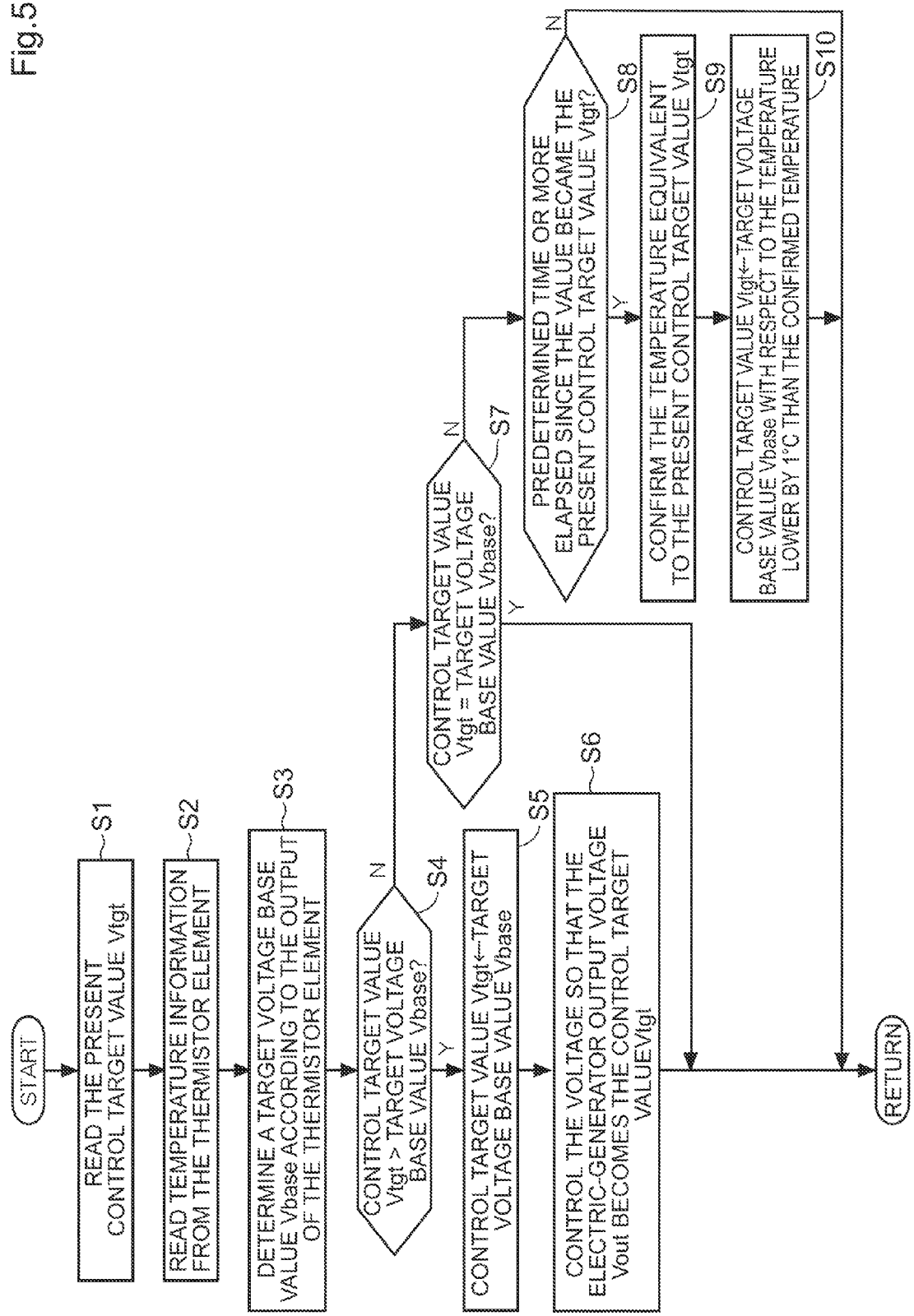
FIG. 5 is a flowchart showing an operation of the AVR in the basis of the function of CPU.

FIG. 5 is a flowchart showing the operation of the AVR 7 based on the function of the CPU 71 shown in FIG. 4. In FIG. 5, in step S1, the present control target value Vtgt is read. In step S2, the output (temperature information) of the thermistor element 75 is read. In step S3, a target voltage base value Vbase corresponding to the output of the thermistor element 75 is determined. The step S3 is performed by the function of the base value determining unit 711.

In step S4, it is determined whether the present control target value Vtgt is greater than the target voltage base value Vbase. If the determination in step S4 is affirmative, the process proceeds to step S5, in which a target voltage base value Vbase is inputted as a control target value Vtgt. In step S6, the output voltage is controlled while controlling the FET 73 so that the electric-generator output voltage Vout becomes the control target value Vtgt.

If the determination in step S4 is negative, the process proceeds to step S7, in which it is determined whether the target voltage base value Vbase and the control target value Vtgt are equal to each other. If the determination in step S7 is negative, the process proceeds to step S8, in which it is determined whether the control target value Vtgt is kept for a predetermined time (herein, 30 seconds). In other words, herein, it is determined whether a state in which the control target value Vtgt is lower than the target voltage base value Vbase continues for a predetermined time.

If the determination in step S8 is affirmative, the process proceeds to step S9, in which the present control target value Vtgt is regarded as being equal to the target voltage base value Vbase, and the temperature of the AVR substrate 74 based on the relationship shown in FIG. 3 is drawn. In step S10, the control target value Vtgt is updated by a target voltage base value Vbase corresponding to the temperature of the AVR substrate 74 that is lower than the temperature drawn in step S9 by a predetermined temperature (herein, 1° C.).

If the determination in step S8 is negative, steps S9 and S10 are skipped, and the process is ended. If the determination in step S7 is affirmative, the process is likewise ended. The process of FIG. 5 is performed in a predetermined interruption cycle.

Although the present invention has been described according to the embodiment, the present invention is not limited to this embodiment, and can be modified based on the contents of the appended claims and based on the conventional techniques. For example, the temperature of the substrate 74 may be indirectly measured by the temperature estimating means although the temperature of the substrate 74 is directly measured by the thermistor element in this embodiment. For example, the temperature of the AVR substrate 74 can be estimated from the output of the electric generator and from the output duration.

Additionally, concerning the output voltage, the electric generator output Vout may be converged with the control target value Vtgt by means of an AVR arranged only by an analog circuit including a comparison circuit using an operational amplifier without being limited to a digital type AVR using a CPU.

Additionally, concerning the upper-limit temperature, the heat-resisting properties of the FET that is a component disposed on the AVR substrate 74 have been chiefly considered, and yet, without being limited to such a component disposed on the AVR substrate 74, the power generation stopping range may be determined based on a component that has the lowest upper-limit temperature among all components in the housing that contains the electric generator body 1, the AVR 7, and the electronic governor 8. Therefore, for example, when the thermistor element 75 is disposed on the electronic governor substrate 13, the relationship of FIG. 3 should be determined in accordance with the closeness degree at which the electronic governor substrate 13 and the AVR substrate 74 are close to each other. In other words, when the electronic governor substrate 13 and the AVR substrate 74 are close to each other, the relationship of FIG. 3 is maintained. On the other hand, when these are apart from each other and when it is beforehand understood that the temperature of the electronic governor substrate 13 is lower than the temperature of the AVR substrate 74, the voltage droop range is shifted to a low temperature range in the relationship of FIG. 3. This makes it possible to exactly protect components disposed on the AVR substrate 74, especially the FET 73.

Additionally, although the present invention has been described in accordance with an example of the electric generator that employs the AVR as an output control means in the above embodiment, the electric generator to which the present invention is applied is not limited to the one that has the AVR as an output control means. The present invention is also applicable to, for example, an inverter electric generator that includes a converter that converts an output alternating current of an electric generator body into a direct current and an inverter device to which the direct current output from the converter is supplied and that outputs an alternating current that has a predetermined frequency. In other words, the present invention is applicable to an electric generator in which an inverter device that is an output control means is provided with a temperature detecting element and, based on the temperature detected thereby, the output voltage of the electric generator is decreased in proportion to a rise in the temperature in a predetermined temperature range and in which the output voltage of the electric generator is decreased in accordance with characteristics that have been preset in the relationship with the temperature so that the decrease degree becomes greater in proportion to a rise in the detected temperature. The output voltage is regulated by changing the on-time duty of a FET that is a component of the inverter device. Additionally, the temperature (limitation starting temperature) at which a fall in the output voltage is started or the power generation stopping temperature in the output control device of the inverter electric generator can be determined, for example, based on temperature characteristics of a FET that is a switching element of the inverter device.

REFERENCE SIGNS LIST

1 . . . generator
2 . . . field winding
3 . . . excitation winding
4 . . . power generation winding
7 . . . AVR
8 . . . electric governor
13 . . . governor substrate
71 . . . CPU
72 . . . Full-wave rectifier
73 . . . FET
74 . . . AVR substrate
75 . . . thermistor element
81 . . . Full-wave rectifier
83 . . . power circuit
84 . . . throttle motor driver
85 . . . CPU
711 . . . base value determining unit
712 . . . control target determining unit
713 . . . FET driving signal output unit

The invention claimed is:

1. An output control device of an electric generator, the output control device comprising:
an output controller that controls an output voltage of the electric generator; and
a temperature detector that detects a temperature in a housing that contains the electric generator;
wherein a voltage droop range is defined as a range between a power generation stopping temperature that is an upper-limit temperature of a component included in the electric generator and a limitation starting temperature that is set at a value lower than the power generation stopping temperature, and
wherein the output controller is an automatic voltage regulator that converges the output voltage of the electric generator with a control target value, and the output voltage is decreased by decreasing the control target value in accordance with the temperature in the range, and the output voltage is increased by increasing the control target value in accordance with the temperature in the range,
wherein, in the voltage droop range, the output controller decreases the control target value in accordance with a target voltage base value that has been preset in a relationship with the temperature so that a decrease in the output voltage becomes greater in proportion to an increase in the temperature detected by the temperature detector, and
wherein, in the voltage droop range, the output controller confirms that the temperature detected by the temperature detector is decreasing and, only after confirming that the temperature detected by the temperature detector is decreasing, the output controller increases the control target value in accordance with the target voltage base value to increase the output voltage, wherein the output controller confirms that the temperature detected by the temperature detector is decreasing when the temperature detected by the temperature detector is detected to continuously decrease for a predetermined time period.

2. The output control device of the electric generator according to claim 1, wherein, if the temperature detected by the temperature detector is lower than a temperature detected last time, the control target value is set to be a value higher by a predetermined amount with respect to a target voltage base value preset in a relationship with the temperature.

3. The output control device of the electric generator according to claim 2, wherein, if the control target value has not been updated for a predetermined time, the control target value is set to be a lower value with respect to the target voltage base value preset in a relationship with the temperature.

4. The output control device of the electric generator according to claim 3, wherein the automatic voltage regulator is arranged into a digital type automatic voltage regulator that includes a substrate on which a CPU and a semiconductor switching device for controlling a field current of the electric generator are mounted, and wherein the temperature detector is a thermistor element that is mounted on the substrate.

5. The output control device of the electric generator according to claim 2, wherein the automatic voltage regulator is arranged into a digital type automatic voltage regulator that includes a substrate on which a CPU and a semiconductor switching device for controlling a field current of the electric generator are mounted, and wherein the temperature detector is a thermistor element that is mounted on the substrate.

6. The output control device of the electric generator according to claim 1, wherein the automatic voltage regulator is arranged into a digital type automatic voltage regulator that includes a substrate on which a CPU and a semiconductor switching device for controlling a field current of the electric generator are mounted, and wherein the temperature detector is a thermistor element that is mounted on the substrate.

7. The output control device of the electric generator according to claim 1, wherein the predetermined time period is 30 seconds.

8. The output control device of the electric generator according to claim 7, wherein, in the voltage droop range, after confirming that the temperature detected by the temperature detector is decreasing, the output controller increases the control target value in accordance with the target voltage base value so that the increase in the output voltage is inversely proportional to a decrease in the temperature detected by the temperature detector.

9. The output control device of the electric generator according to claim 1, wherein, in the voltage droop range, after confirming that the temperature detected by the temperature detector is decreasing, the output controller increases the control target value in accordance with the target voltage base value so that the increase in the output voltage is inversely proportional to a decrease in the temperature detected by the temperature detector.

10. The output control device of the electric generator according to claim 1, wherein the output controller controls the electric generator to stop generating power so that the output voltage becomes zero when the temperature is detected to increase and become higher than the power generation stopping temperature, and wherein the output controller controls the electric generator to begin generating power when the temperature is detected to decrease and become lower than the power generation stopping temperature.

\* \* \* \* \*